United States Patent
Chivers

(10) Patent No.: US 9,524,478 B2
(45) Date of Patent: Dec. 20, 2016

(54) MANAGING EVIDENTIARY INFORMATION ITEMS RELATED TO MULTIPLE CASES

(75) Inventor: Ian Chivers, Redland Bay (AU)

(73) Assignee: Monica Mary Dunne, Queensland (AU)

(*) Notice: Subject to any disclaimer, the term of this patent is extended or adjusted under 35 U.S.C. 154(b) by 326 days.

(21) Appl. No.: 12/990,050

(22) PCT Filed: Apr. 28, 2008

(86) PCT No.: PCT/AU2008/000584
§ 371 (c)(1),
(2), (4) Date: Sep. 29, 2011

(87) PCT Pub. No.: WO2009/132377
PCT Pub. Date: Nov. 5, 2009

(65) Prior Publication Data
US 2012/0017174 A1    Jan. 19, 2012

(51) Int. Cl.
*G06Q 10/06*    (2012.01)
*G06Q 50/18*    (2012.01)

(52) U.S. Cl.
CPC ............. *G06Q 10/06* (2013.01); *G06Q 50/18* (2013.01)

(58) Field of Classification Search
CPC ...... G06Q 10/06; G06Q 50/18; G06F 3/04842
USPC .................. 715/810; 235/375; 705/7.27, 311
See application file for complete search history.

(56) References Cited

U.S. PATENT DOCUMENTS

| | | |
|---|---|---|
| 6,526,438 B1 | 2/2003 | Bienvenu et al. |
| 7,359,925 B2 | 4/2008 | Sugiyama |
| 7,889,953 B2 * | 2/2011 | Fox et al. ...................... 382/305 |
| 2002/0065677 A1 * | 5/2002 | Grainger ................ G06Q 10/10 705/310 |
| 2002/0173975 A1 * | 11/2002 | Leventhal ......................... 705/1 |
| 2004/0260569 A1 * | 12/2004 | Bell et al. ......................... 705/1 |
| 2004/0267593 A1 | 12/2004 | Sammons et al. |
| 2005/0166139 A1 * | 7/2005 | Pittman et al. ............... 715/511 |
| 2007/0055532 A1 * | 3/2007 | Jneid ................................ 705/1 |
| 2009/0119324 A1 * | 5/2009 | Simard et al. ............... 707/102 |

FOREIGN PATENT DOCUMENTS

| | | |
|---|---|---|
| JP | 2011-110275 | 4/1999 |
| JP | 2001-75811 | 3/2001 |
| JP | 2006-65874 | 3/2006 |
| JP | 2008-502993 | 1/2008 |

OTHER PUBLICATIONS

"Creating links to files and directories", The SCO Group, Inc., Apr. 22, 2004, 4 pages.*

* cited by examiner

*Primary Examiner* — Li Sun
(74) *Attorney, Agent, or Firm* — Wood, Phillips, Katz, Clark & Mortimer

(57) ABSTRACT

The invention concerns managing information, such as managing evidence that is relevant to multiple legal proceedings. After the item has been received and stored in common database (30) it is automatically duplicated (14) to databases of the pre determined (12) related cases (60,70) and (80). The related cases (60, 70, 80) are able to store information that is specific to the relevant case. Aspects of the invention include a computer system, method, software and user computer generated interfaces for managing evidentiary information items.

16 Claims, 11 Drawing Sheets

FIG. 8A

| Identity | Date | S/H/A | Doc Type |
|---|---|---|---|
| BTB.001.001.0001 | 14/08/2001 | Single | Letter |
| BTB.001.001.0002 | 20/03/2002 | Single | Letter |
| Without Prejudice | | | |
| BTB.001.001.0003 | 23/07/2001 | Host | Letter |
| Construction of New Stick Residence - Plot 1 Forrest Way - Shire of Enchanted Wood Construction of New Stick Residence - Plot 1 Forrest Way - Shire of Enchanted Wood Construction of New Stick Residence - Plot 1 Forrest Way - S of Enchanted Wood | | | |
| BTB.001.001.0004 | 23/07/2001 | Attachment | Quotation |
| Proposed Stick Residence - Plot 1 Forrest Way - Shire of Enchanted Wood - Professional Consultancy Services - Scope of Work and Fee Submission | | | |
| BTB.001.001.0007 | 23/07/2001 | Host | Letter |
| Construction of New Straw Residence - Plot 2 Forrest Way - Shire of Enchanted Wood | | | |
| BTB.001.001.0008 | 23/07/2001 | Attachment | Quotation |

1 of 18 Results

I should, however, put my Prudent Businessman ha eloquently put it "express an appreciation of the concerned that they may not meet Council's string happy to engage Bobby the Builder, we proceed requires a rethink of the project, we'll investigate an We'd love to be a part of your vision. Please let concepts for your review.

Best regards

*B Smirofficus*

Robert (Bobby) Smirnofficus

Managing Director

☐ Auto close  [Update]

Entities
Audit
Done

MANAGING EVIDENTIARY INFORMATION ITEMS RELATED TO MULTIPLE CASES

TECHNICAL FIELD

The invention concerns evidentiary information items relating to multiple proceedings. For example, but not limited to, the invention concerns managing evidentiary information items that all relate to multiple legal proceedings. Aspects of the invention include a computer system, method, software and user computer generated interfaces for managing evidentiary information items.

BACKGROUND ART

Proceedings, such as mediations, court cases and tribunal hearings often share common facts and/or issues. As such, multiple proceedings often share common items of evidentiary information that relates to the common fact or issues.

For example, legal proceedings before the court may have simultaneous cases pending, such as where a patentee commences separate infringement proceedings against three different infringers. The cases share a set of facts and issues that are each proved or disproved by items of evidentiary information. For example, a copy of patent itself, and expert evidence on the construction of the claims will be referred to by the patentee during all three proceedings.

SUMMARY OF THE INVENTION

In a first aspect the invention is a method of aiding the management of evidentiary information related to a first proceedings and a second proceedings, the method comprising:

(a) receiving an item of evidentiary information;
(b) receiving an indication that the item is related to the first proceedings, and is related to the second proceedings;
(c) if an indication that the item is related to the first proceedings has been received, storing the item in a first datastore of the first proceedings, wherein the first datastore is able to store associated with the item first specific data that is specific to the item and the first proceedings; and
(d) if an indication that the item is related to the second proceedings has been received, storing the item in a second datastore of the second proceedings, wherein the second datastore is able to store associated with the item second specific data that is specific to the item and the second proceedings.

The method may further comprise:
receiving a modification or addition to the item;
if an indication that the item is related to the first proceedings has been received, storing the modification or addition to the item in the first datastore; and
if an indication that the item is related to the second proceedings has been received, storing the modification or addition in the second datastore. These storing steps may be automatic.

The method may further comprise storing the received item and indications in a third datastore. The method may further comprise the step of receiving an indication that the item can be stored in datastores of the related proceedings, (i.e. released) and then automatically performing steps (c) and (d).

The method may further comprise receiving and storing an indication that the first and second proceedings are related to the third datastore.

The method may further comprise the steps of:
receiving and storing in the first datastore associated with the item first specific data; and
receiving and storing in the second datastore associated with the item second specific data.

Receiving an indication that the item is related to a proceeding may comprise:
assigning a tag to the item; and
assigning the tag to the datastore of the proceeding.

The method may further comprise assigning further tags to the item.

An item of evidentiary information includes, but is not limited to, sound recordings, images, videos, links, maps, plans, drawings or photographs.

The item of evidentiary information may also include bibliographic data of the item.

The proceedings may be legal proceedings.

The specific data may include comments, relevant issues, whether it is discoverable, an indication of its importance and any other annotations that relate to specifically relate to the associated legal proceedings.

In a second aspect, the invention provides computer software, that when installed on a computer system causes it to operate in accordance with the method described above.

In a third aspect the invention provides a computer system to aid the management of evidentiary information that is related to a first proceedings and a second proceedings, the computer system comprising:
an input port to receive the item;
a datastore to store an item of evidentiary information and an indication that the item is related to a first proceedings, and is related to a second proceedings, the datastore is comprised of
a first datastore of the first proceedings to store the item and associated with the item first specific data that is specific to the item and the first proceeding, and
a second datastore of the first proceedings to store the item and associated with the item second specific data that is specific to the item and a second proceedings;
a processor to determine if an indication that the item is related to the first proceedings is stored in the datastore, and if so to cause the item to be stored on the first datastore, and to determine if an indication that the item is related to the second proceedings is stored in the datastore, and if so to cause the item to be stored on the second datastore.

The datastore may be distributed. The computer system may itself be distributed with the processor being distributed.

The computer system may further provide a set of computer generated interfaces for presenting the evidentiary information to a secure user group, each datastore having at least one interface.

The interface to the third datastore may be operable to receive the evidentiary information item.

The interface to the first datastore may be operable to receive the first specific data, and the processor may operate to store the first specific data in the first datastore.

The interface to the second datastore may be operable to receive the second specific data, and the processor may operate to store the second specific data in the second datastore.

The interface to the first and second datastores may not be operable to receive evidentiary information item.

The interface to the third datastore is not operable to receive specific data specific to the item and a proceeding. The interface to the third datastore may be operable to receive the indications.

The interface may be an online interface, such as a website.

The management and running of related proceedings simultaneously by their nature can be a difficult undertaking. It is an advantage of the invention that it provides a reduction of effort to manage evidence that is common to all proceedings. An advantage of at least one embodiment of the invention includes:

Data Integrity—A superior level of data accuracy can be achieved through the centralisation of the item of evidentiary information and the bibliographic data. A greater level of control can be exercised over the data capture process through the use of controlled look-up fields and a higher level of standardisation can be achieved through the centralised monitoring of the data entry effort. It helps to eliminate the need for repetitious importing and exporting of data across the various proceeding databases as data is further developed.

Resources—As data and analysis need only be entered once on common documents to be available across multiple proceedings, the number of paralegal and legal professional resources which need to be applied to the data capture effort can be reduced. From a technical perspective effort will be minimised as the need to import and export data is all but eliminated from the process.

Time—As data and analysis need only be entered once on common documents to be available across multiple proceedings, the time taken to undertake the data capture effort can be reduced. Once again the amount of technical effort to support the multiple cases should be reduced.

Cost—The reduction of time and resources applied to the development of the proceeding databases generates a significant cost benefit.

BRIEF DESCRIPTION OF THE DRAWINGS

An example of the invention will now be described with reference to the accompanying drawings, in which:

FIGS. 3 to 9 are various examples of the interfaces to the databases used with the invention.

BEST MODES OF THE INVENTION

In this example multiple proceedings, such as cases, mediations, and other meetings or negotiations share a quantity of evidentiary information that in someway relates to one or more proceedings. These proceedings are referred to here as "satellite cases".

A piece of evidentiary information has two types of information related to it:
1. objective information: based on the factualness of the information.
2. case specific data: based on how the evidentiary information relates to the specifics of the case.

In this example, the item of evidentiary information and its associated objective information is shared by the satellite cases, and is referred here as the "common evidence". An example of an item of evidentiary information is a copy of the document itself. The objective information is usually bibliographic and includes:
   a unique identifier
   document type, selected from a set of possible types
   whether the document represents the original or a copy
   the date of the document
   related to which parties or organisations
   whether the document is "released" (discussed in further detail below)

The case specific data is not part of this common evidence and is not shared. Examples of case specific data include issues assigned to the document, the importance of the document and any comments, or annotations made to the document.

In this example, the invention is implemented using a computer system and software to store and manage evidentiary information for multiple proceedings.

Figure 1:
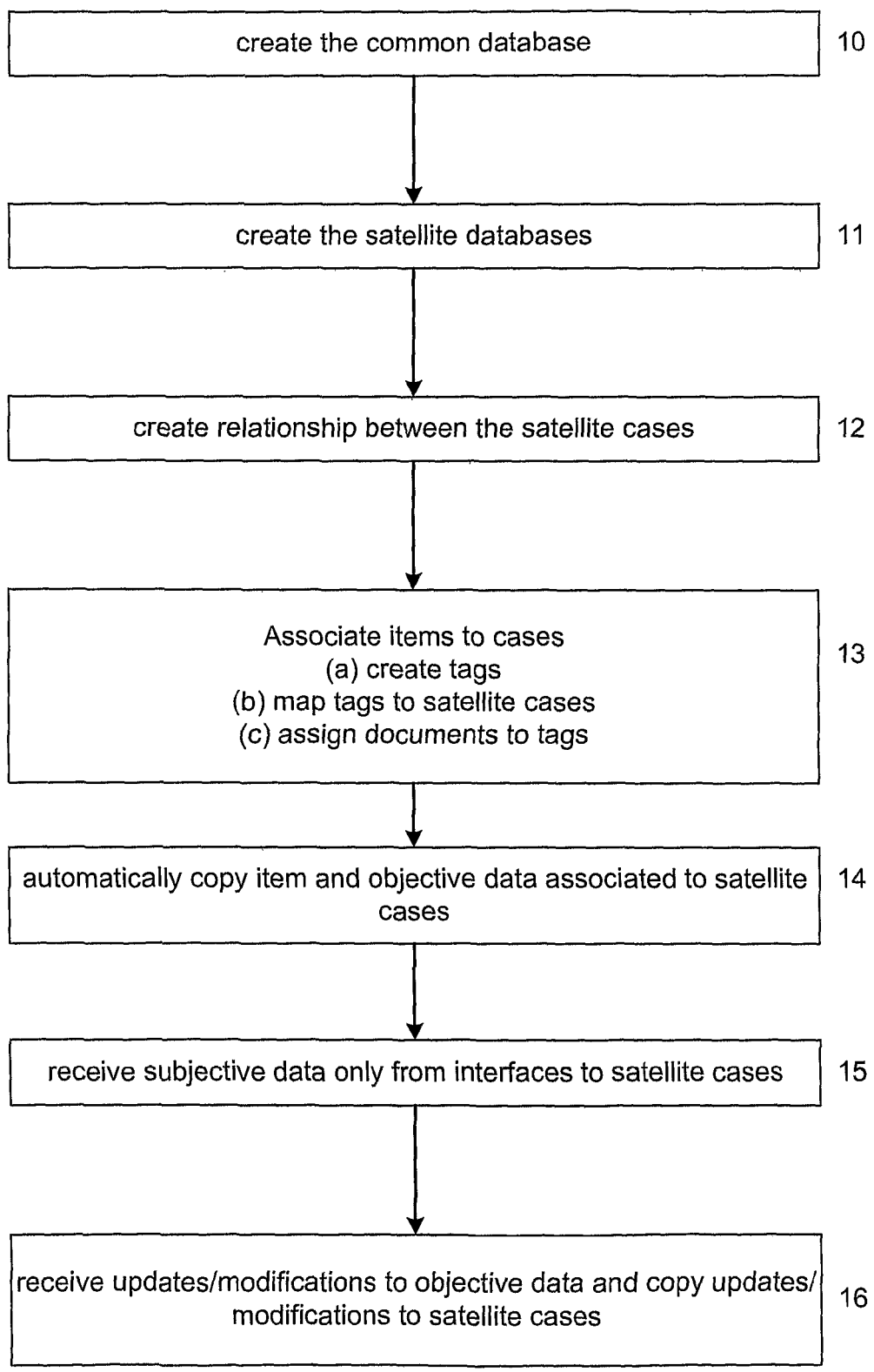
FIG. 1 is a simplified flow chart of the invention.
Figure 2:
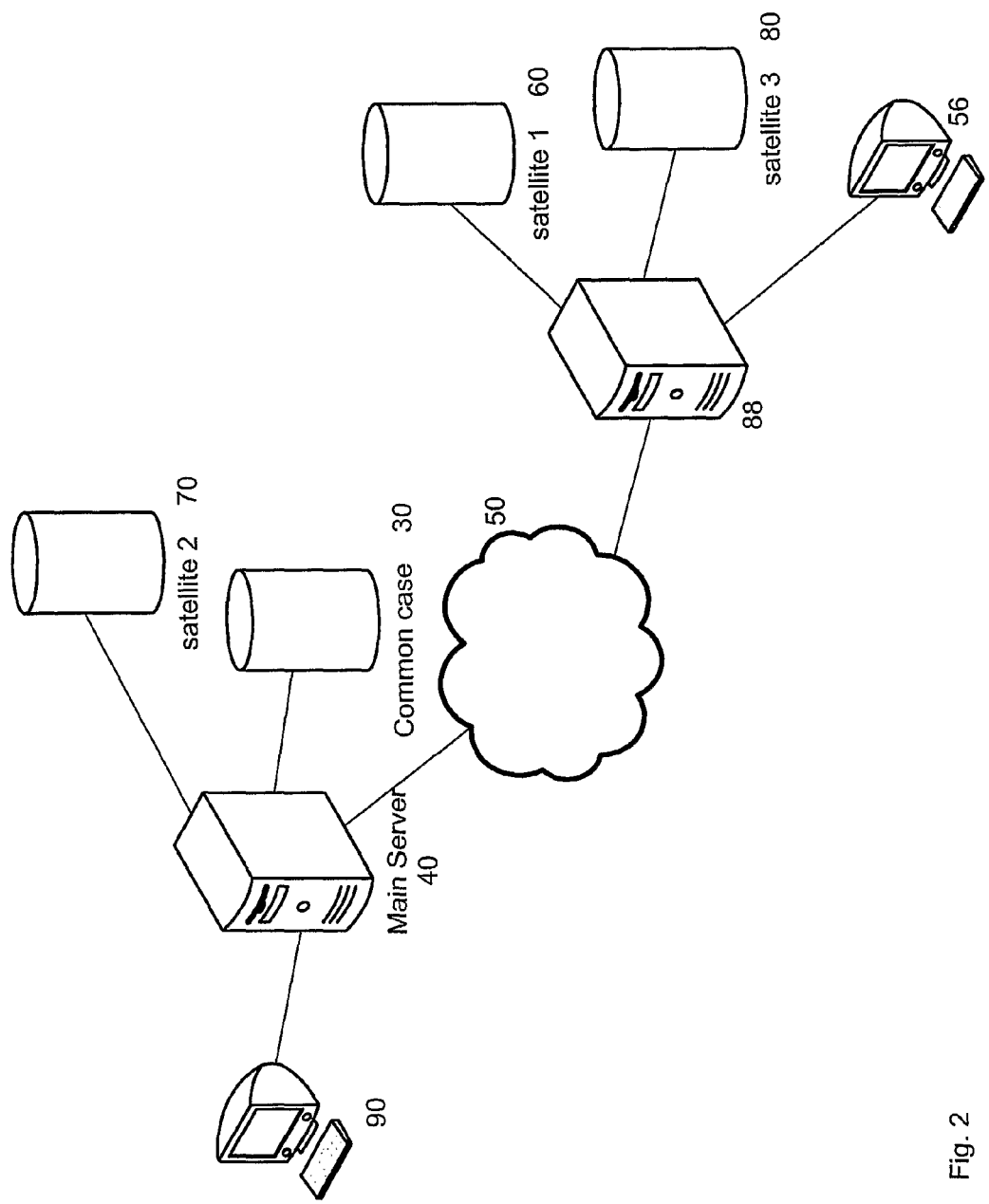
FIG. 2 is a schematic diagram of the computer system of the invention.

The method of creating and managing the satellite cases and common evidence will now be described with reference to the flow chart of FIG. 1 and the computer system schematically shown in FIG. 2.

Firstly, a device to connect the multiple satellite cases that rely on common evidence and to store the common evidence must be created 10.

In this example, a database 30 connected to a server 40 is created that will store all the documents common to the set of satellite cases. This database 30 will be referred as a "common case". The structure of the common case 30 is the central element within a group of multiple related cases. Its structure is similar to satellite cases (discussed below). It has additional structure and functionality to allow it to act as this central element. At the same time the common case has limited functionality by being able to accept and store only objective data (and no case specific data). A common case is the distributor for meta-data publication/updates into one or more satellite cases. The common case 30 contains the objective meta-data for all the documents that are part of the broader group of related cases, and also provide a single data entry point for the other non-evidentiary data such as usernames, passwords, and group memberships.

To aid setup, this additional functionality and limitations of functionality for the common case could be achieved by running a script on an otherwise standard case.

In this example all the evidentiary documents and objective data for the common case 30 are stored in the one database. This database 30 could of course be a distributed database (not shown). The common case 30 is connected to a server 40 that in turn is connected to the Internet 50. In this way, contents of the common case 30 can be accessed remotely using this connection to the Internet 50.

Next, the satellite cases are created 11. Satellite cases are a database that is part of a group of related cases, and is limited in functionality to subjective data analysis tasks. A satellite case receives evidence items and objective data from a single common case 30. The documents contained in a satellite case are determined by tag-to-case mapping within the common case (discussed later below). These satellite cases are created as separate databases on the same or different server as the common case 30. A database for a satellite case is referred to here as "satellite case".

In this example, three satellite cases are created named "satellite 1" 60, "satellite 2" 70, and "satellite 3" 80. Satellite 1 60 and satellite 3 80 are connected to server 88 that is inturn connected to the Internet 50. Using this Internet 50 connection, these satellite cases 60 and 80 are able to receive the common evidence. Satellite case 70 is connected to the server 40, and it uses the common connection to server 40 to receive the common evidence on the common case 30.

Figure 3:
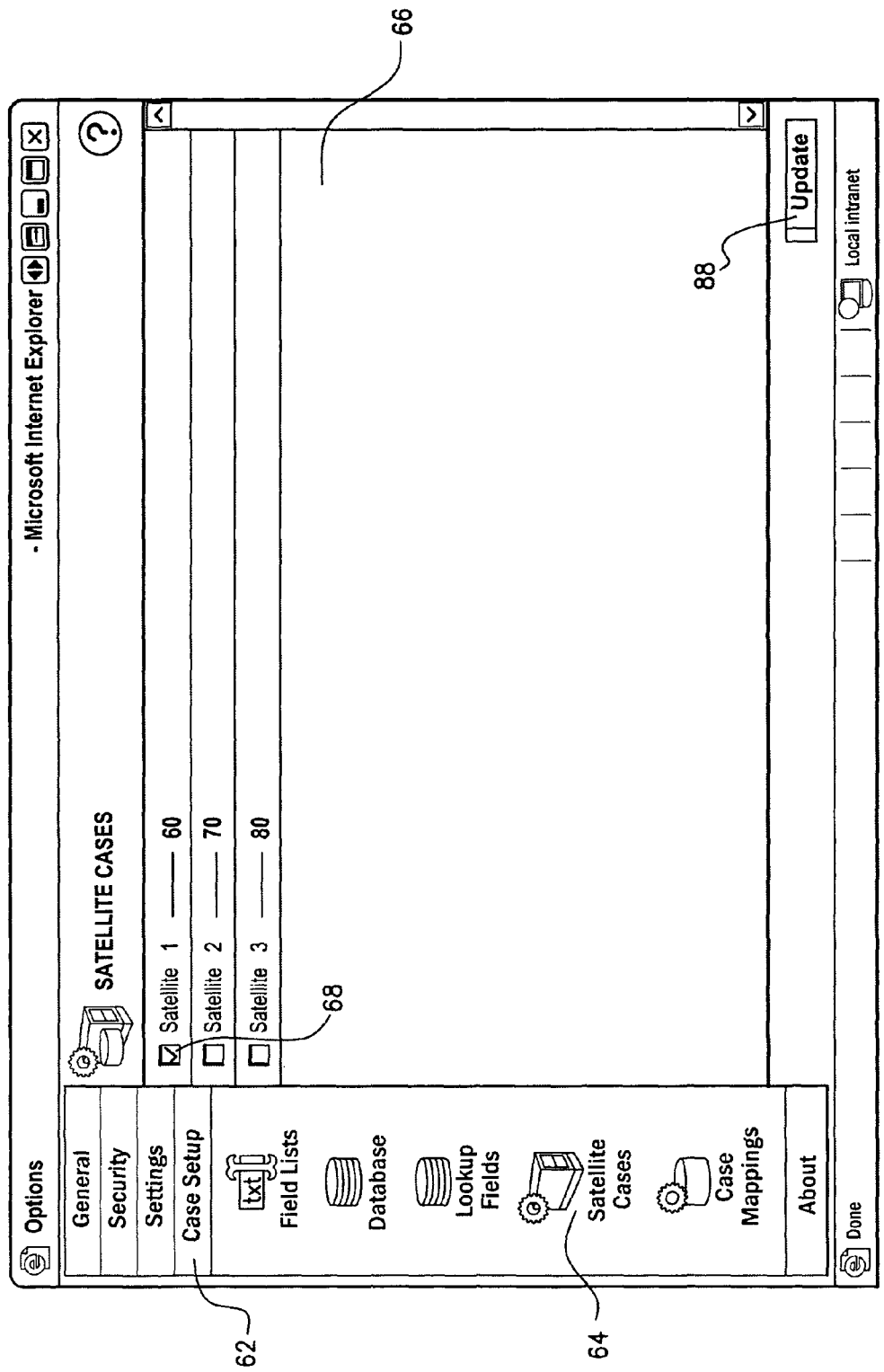

The three satellite cases 60, 70 and 80 are then linked as being related to the common case so that they function as a group 12. This is done at an interface for the common case 30 as shown in FIG. 3. In this example the user accesses the interface using the personal computer 90 that is connected directly to the server 40. Alternatively, using the Internet connection 50 the interface could be viewed remotely 56. This interface is the interface for the management options for the common case, and in particular the management options related to the module "Case Setup" 62. From here the icon representing the "Satellite Cases" 64 is selected to provide a list of all available cases that are displayed on the right hand side of the interface 66. This list may be limited to the cases directly linked to server 40, or may include a search for satellite cases connected to the server 40 using the Internet 50. Cases that are currently linked to the current common case will be pre-selected, as indicated by the tick in the box 68 for the satellite case Satellite 1 60. In this example, a satellite case can only be part of one related group of cases. Consequently, if cases are already part of a different common evidence group of related cases, they will not appear in this display.

Establishing a link to a satellite case will setup the selected satellite case with the necessary database configuration to allow syndication between the common case and the satellite case. Syndication is understood here to mean to publish, or supply for simultaneous publication between multiple systems.

Performing this action configures the satellite case to receive and store from the user only data that is subjective to the satellite case, referred herein as the "subjective analysis mode". That means that the satellite case is not able to receive data that is objective to the satellite case, referred herein as "objective analysis mode", other than from the common case 30.

To create a link between the current common case and a satellite case, the user ticks the checkbox next to the appropriate case and then clicks the update button 88. In this example all three satellite cases 60, 70 and 80 are linked in.

Next, tags are created to associate items to one or more satellite cases 13. Firstly, the tags must be created 13(a). Tags are an indication that a group of evidentiary information have something in common and are in someway related. Using tags is a good way to save search results, or group related items into a set. Here, tags are mapped to satellite cases to become part of the common case architecture. These tags defines how the evidentiary information is distributed. Selecting a simple, logical, easy to manage tag hierarchy will assist in being able to identity at a glance precisely how the evidentiary information is distributed throughout the satellite cases.

There are many different ways that you could logically structure a tag hierarchy to best delineate how documents are mapped into the satellite cases and the most suitable structure should be identified and applied.

Figure 4:
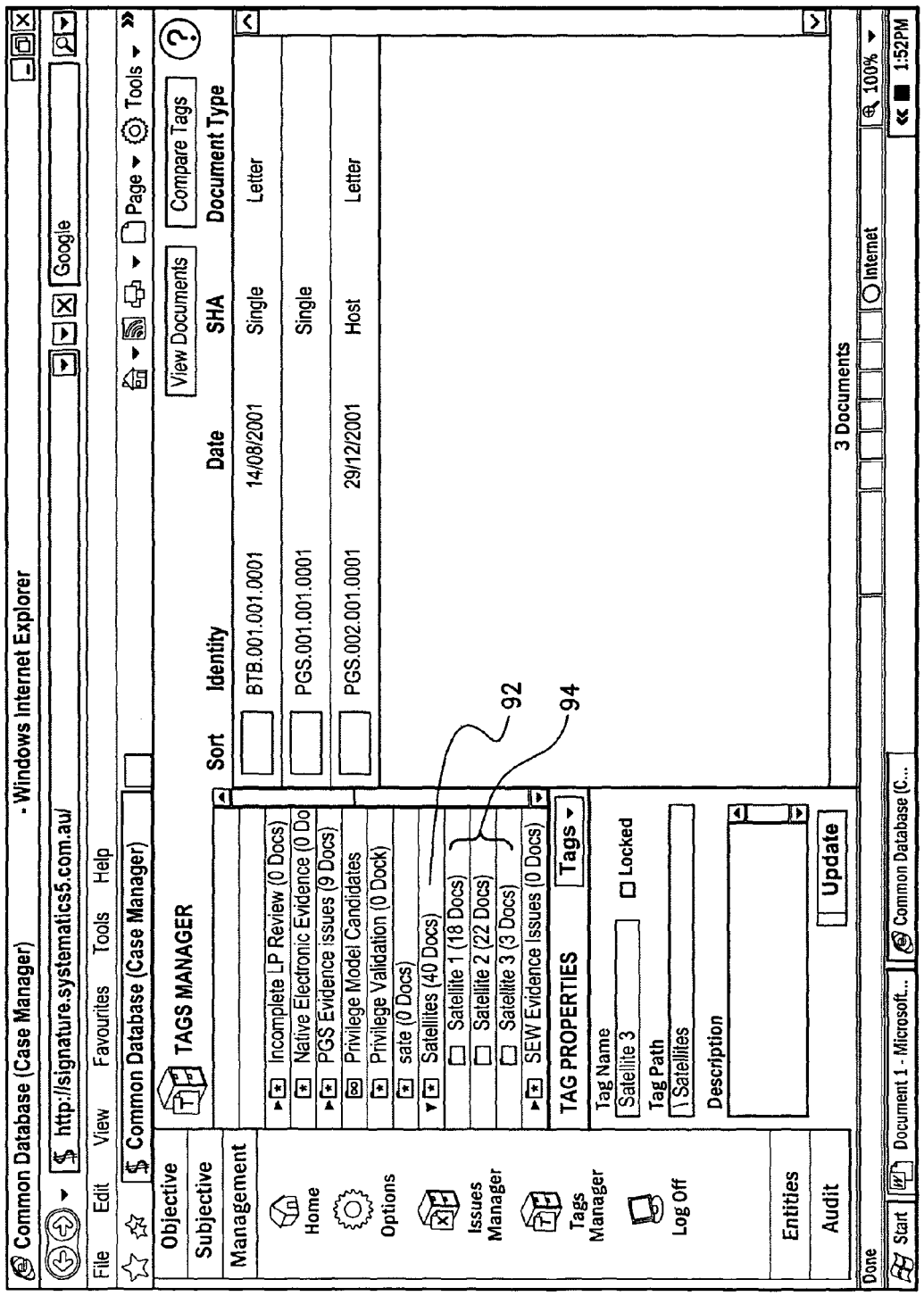

The tags that define the satellite case mappings may not be the only tags of the common case. Therefore in this example as shown in FIG. 4 a Level 1 tag called 'Satellites' 92 is created that can store all the individual satellite case/tag maps. Under this parent tag, sub-tags 94 are then created for each satellite case.

It may be helpful to further break-down the tag hierarchy into more discrete bundles of documents. Some examples of categories that may be useful are:

Documents that are only relevant to this case;
Documents that are common to multiple cases, but not all; or
Logical groups of categorised documents.

It may also be appropriate to create a tag called "common to all", that is comprised of all the documents that will be common to every satellite case.

The important aim is to implement a tag hierarchy that is easy for users to understand, and clearly allows the identification of:

Which documents belong to a specific satellite case; and
Which specific cases contain a given document.

The remaining tags that are not associated with cases are created and used to simply group documents that are on the common database. For example, these tags could be used for data entry purposes, with a tag created for each user.

Once a tag for each satellite case is established, a mapping between the designated satellite case and corresponding tag is created 13(b). The purpose of associating a satellite case with a set of tags is to specify the documents that will be mapped to the case. In simpler terms, associating a tag with a satellite case is the equivalent of saying that documents assigned to tag 'A' belong in Satellite Case 'A'.

Figure 5:
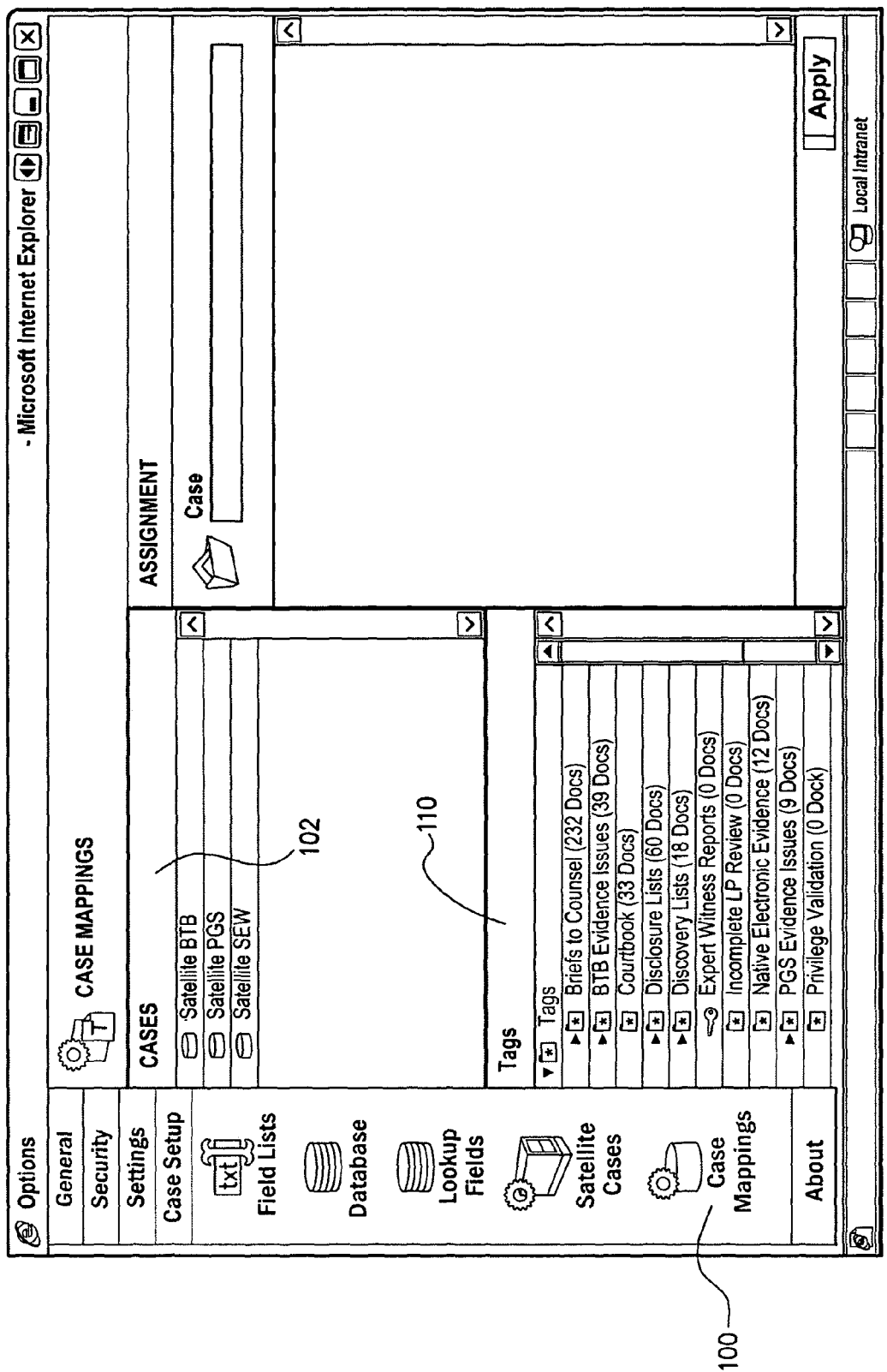

Referring to FIG. 5, clicking on the Case Mappings module 100 on the common case management interface displays the cases that are were selected as satellite cases at step 12 and the tags 110 present in the common case from step 13(a). From this screen you can either select a case and assign tags to it, or select a tag and assign case(s) to it.

To open the Case Mappings Module, click on the Case Mappings 100 icon under the Case Setup tab.

Figure 6:
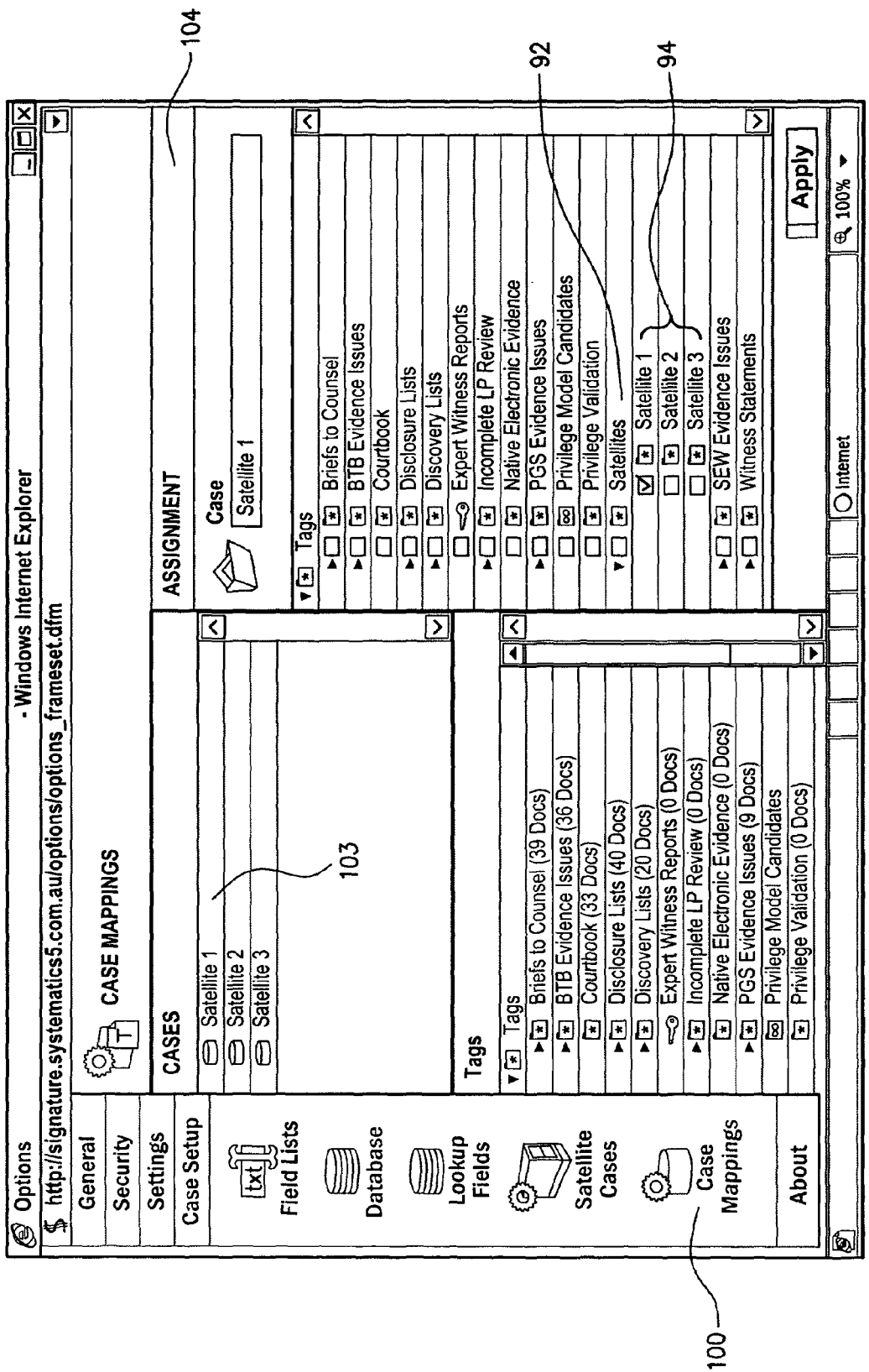

To associate a satellite case with one or more tags, click on the case you wish to assign to a tag in the CASES section 102 in the top left, in this case "Satellite 1" 103 is selected. This will display the available tags including those that are already assigned to the selected case in the ASSIGNMENT section 104 as shown in FIG. 6. Tick the tag(s) that are to be associated with the case and click the Apply button 106.

This can be repeated for satellite cases "Satellite 2" and "Satellite 3" as required.

Figure 7:
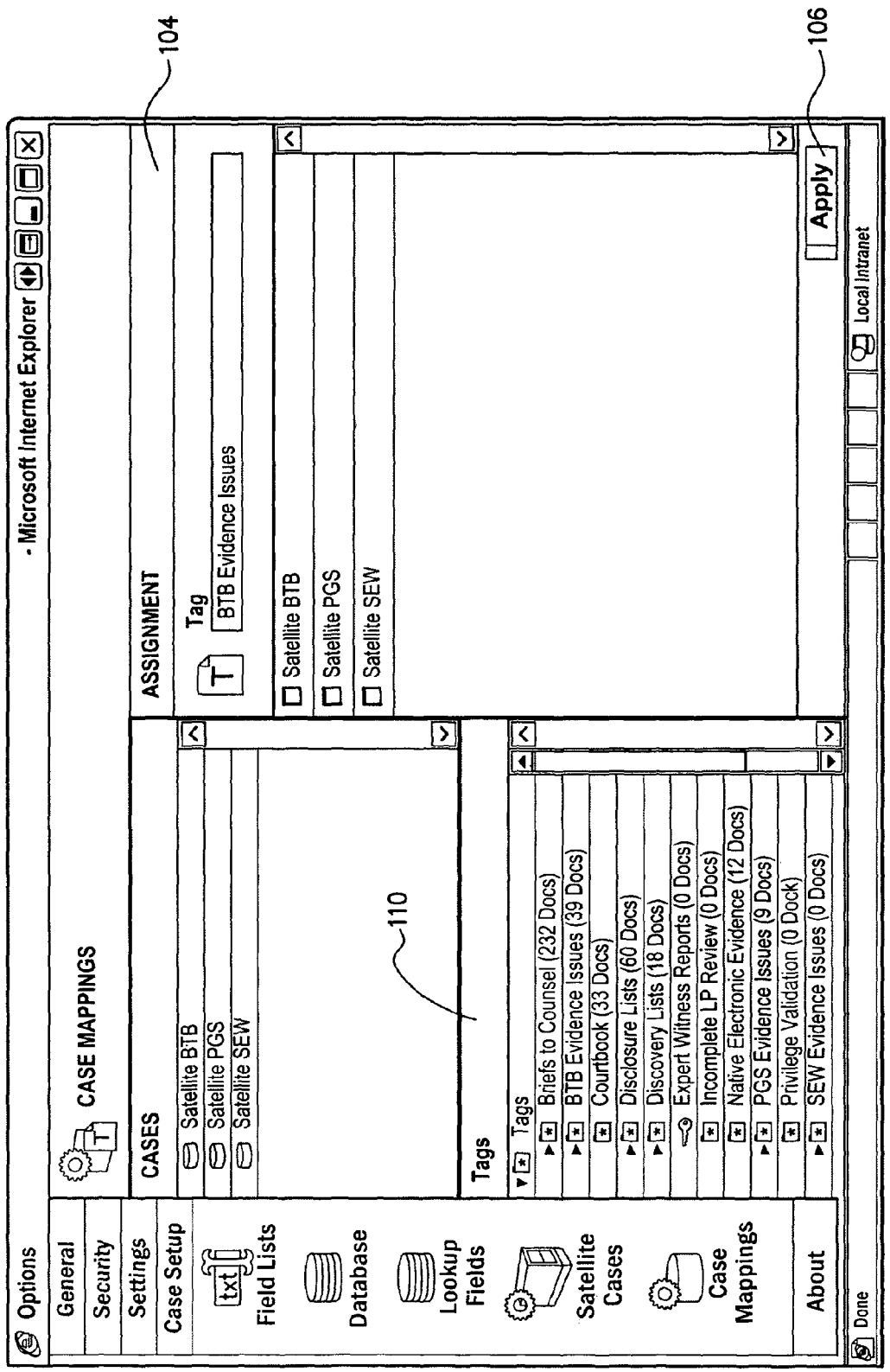

Alternatively or in addition, tags can be associated with satellite cases 13(b). Referring to FIG. 7, to associate a tag with one or more satellite cases, click on the tag you wish to assign to a case in the TAGS section 110 in the bottom left. This will display the available cases including those that are already assigned to the selected tag in the ASSIGNMENT section. Tick the case(s) that are to be associated with the tag and click the Apply 106 button.

Next, the specific sub-tags (or tags) are then assigned to all the documents that will be part of the corresponding satellite case 13(c). The document is received by the server 40 at an import, such as by CD drive or over the Internet 50 and stored in the common database 30.

Having (i) already identified the cases that are part of the group of related cases for the current common case, (ii) created a tag hierarchy that is appropriate for mapping, and (iii) assigned the relevant tags to their corresponding satellite cases, you are now able to begin tagging documents to these tags and the automated syndication and replication process will begin to work.

Figure 8A:
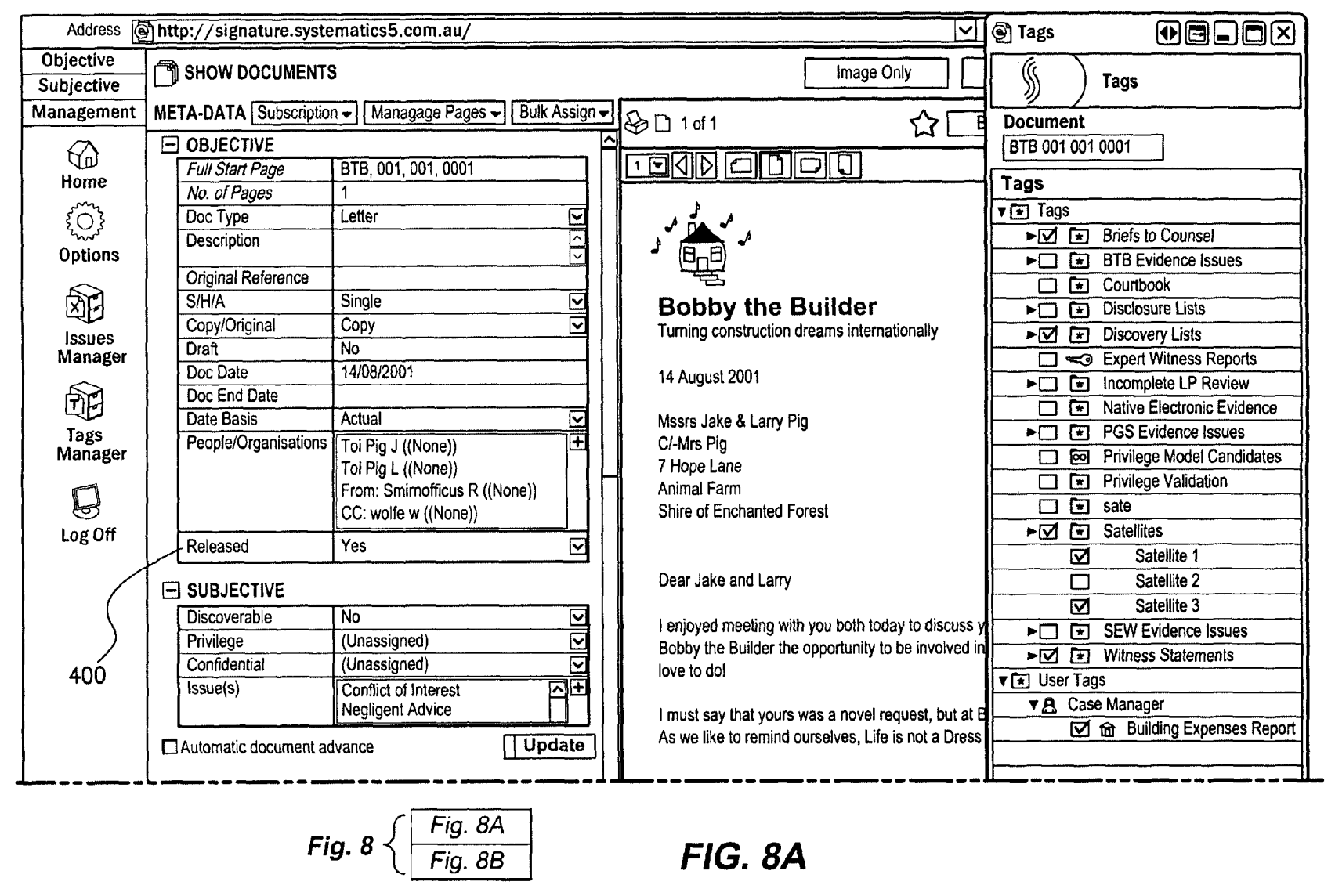

This is shown in FIG. 8 where an item of evidence is selected. The possible tags that could be associated with the item are also shown. Here tag "Satellite 1" is selected to assign this tag to this item. This is repeated for all documents, where tags can be assigned to multiple documents at the same time.

Certain actions, conditions and circumstances that need to be met in order for a document in the common case to be copied into the satellite cases 14. The following conditions are a requirement for documents to syndicate to a Satellite case:
  the satellite case must be selected as being part of the current common case;
  the satellite case must be mapped/associated with at least one tag;
  the documents must be tagged to at least one of these mapped tags; and
  the documents must be "released".

There are two ways for a document to syndicate into a satellite case:
  1. Assign a tag associated with the satellite case to the document and then release the document for subjective review; or
  2. Release the document for subjective review and then assign a tag associated with the satellite case to the document.

Either way, when this condition is met an automatic trigger will copy the item and objective data of the item into all the satellite cases that the document has been assigned to, and the document will then be available for subjective review within the satellite case 15.

Now that the common case, satellite cases and tags have been created the structure can now be used to allow sharing of evidentiary information.

The common case is designed to be the single data entry point for all documents within the common evidence architecture. Single data entry is appropriate because the information is factual and not subject to opinion, and therefore will not change between cases. The satellite cases receive publication of this data from the common case and therefore there is no facility to modify the objective data from within the satellite case. In this example, only a copy of the evidentiary item and the subjective data is copied across. No other information related to the evidentiary information is copied across, such as details of the tags that are assigned to the document.

If any objective data needs to be modified, the changes must be performed in the common case 16. These changes will be automatically applied to each satellite case as appropriate based on the tag. This process ensures the integrity of the objective data across all cases.

If the documents in the folder have already been tagged to a tag that is mapped to one or more Satellite cases, then the documents will be syndicated to the satellite case upon Release of the relevant folder.

If however, the documents have not already been tagged to a tag that is mapped to one or more satellite cases, then after Releasing the folder you will also need to bulk assign the folder to the relevant satellite tags.

Documents can not be part of a satellite case until they have been released. As described above documents can be released when the folder is released; however, it may be necessary to release a single document (for example, when a new document is added to a folder, or if an existing document is split into multiple documents).

Releasing a single document can be achieved by setting the value of the Released field to 'Yes' as shown at 400 of FIG. 8.

Figures 9, 9A:
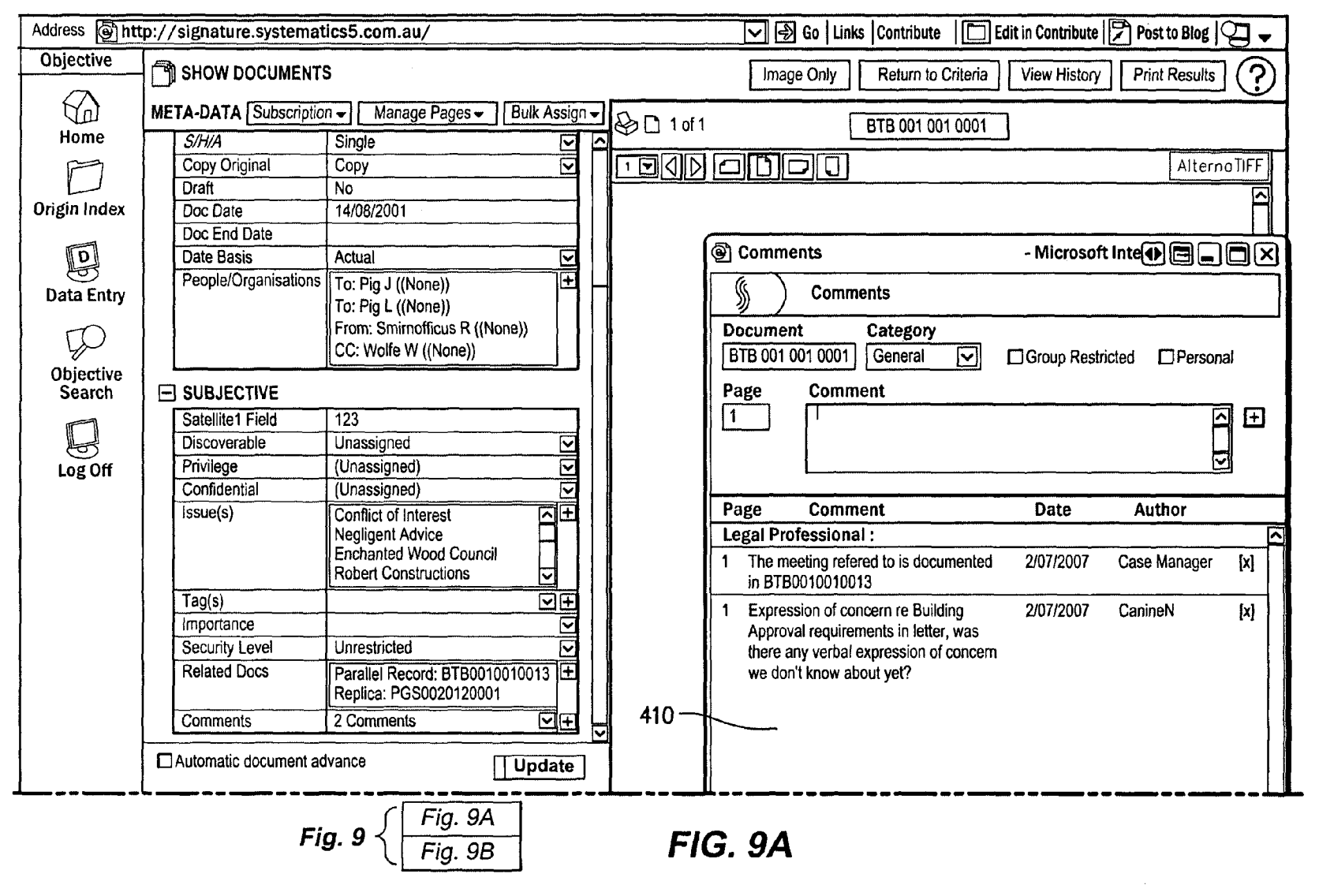
Figure 9B:
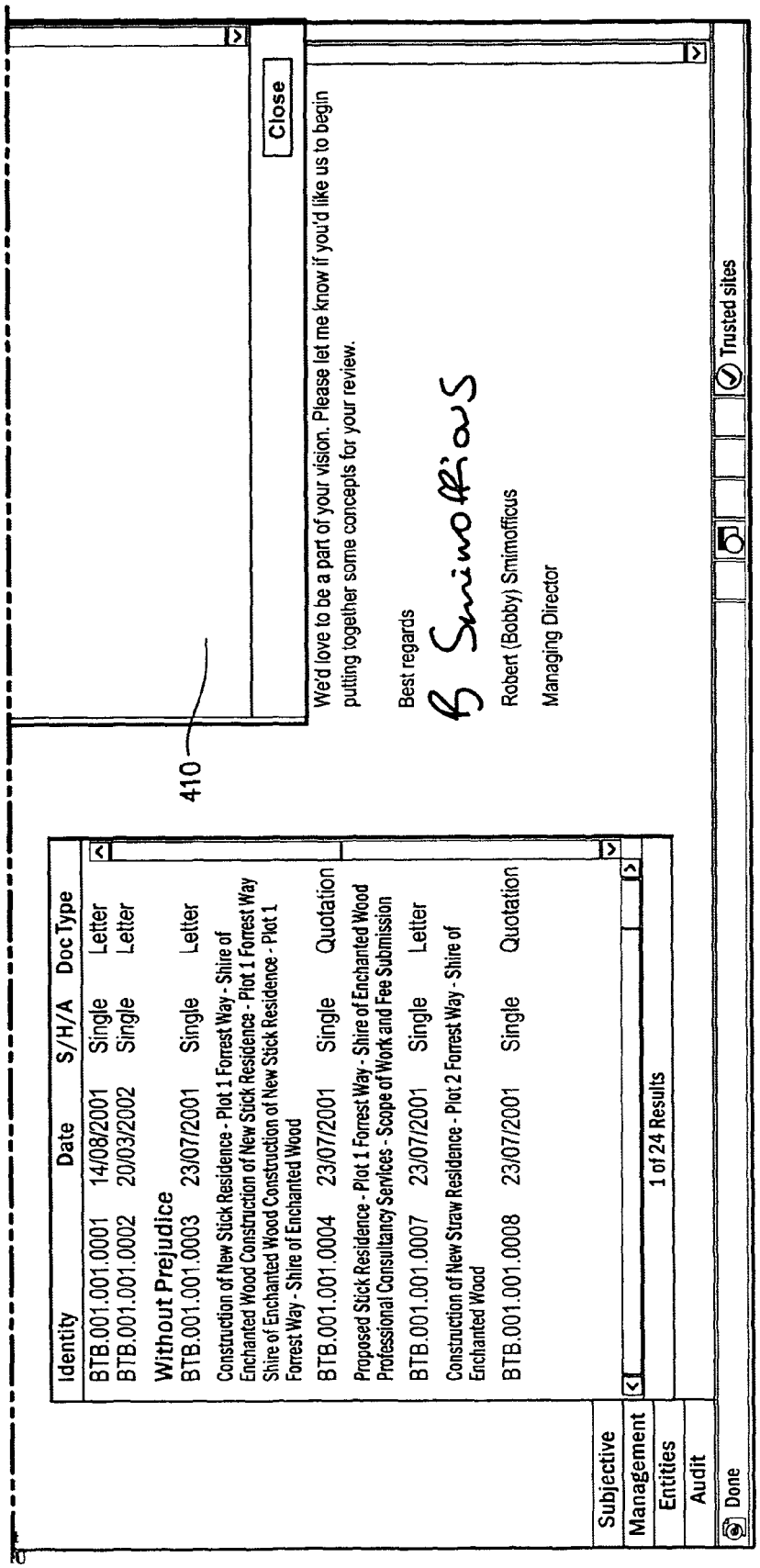

Using an interface to the satellite case, subjective data can be added 15. In this example, FIG. 9 shows the interface for Satellite Case 1. Using this interface an evidence item that has been copied to the satellite database 60 can be viewed. Then, using this interface subjective data, such as making comments, annotating the document, and identifying issues that is related specifically to Satellite 1 can be entered in and is stored on the database 60. This subjective information is not replicated back to any database, such as the common database 30 or database 70 that also store a copy of that piece of evidence. FIG. 9 shows comments 410 on this document that is an example of subjective information. When this document is viewed using the interface to the common database 30, this comment would not be visible.

It is important to note that the objective data relating to document can not be amended using this satellite interface.

If a document that was mapped to satellite case 1 was not "released" it would not be visible from this interface.

The interface to satellite cases 2 and 3 operate in the same way as the interface to the satellite interface 1 with each referring to their own respective database.

It will be appreciated by persons skilled in the art that numerous variations and/or modifications may be made to the invention as shown in the specific embodiments without departing from the scope of the invention as broadly described.

The process of establishing a link with a common case and a satellite case can be reversed by deactivating the link. No case data is removed or modified when a link is deactivated, however whilst a case is deactivated it will not receive any updates from the common case.

The order of some steps of the method is not important. For example, you can add satellite cases after automatic copying of some documents to other satellite cases has begun.

The interface may be username and password controlled and this may provide users with different levels of access. For example, not everyone can change settings on the common case.

In an alternative embodiment the interface to the satellite cases may allow entry of documents directly into the satellite database. In this case using a satellite case interface objective data can only be entered on documents entered directly into the satellite database and not on documents copied over from the common database. This may be achieved by setting a flag representing the source of the item for each item in the satellite cases.

The present embodiments are, therefore, to be considered in all respects as illustrative and not restrictive.

Claims defining the inventions are follows:

1. A computer-implemented method of aiding the management of evidentiary information related to a first case and a second case, the method comprising:
  creating a first database and a second database for storing case specific data for the first case and the second case respectively;
  creating a third database for storing common facts and/or common issues shared between the first case and the second case;
  linking the first database and the second database to the third database via user input through a management Graphical User Interface specific to the third database and storing the linking in the third database;
  receiving data for an item of common evidentiary information via user input through the management Graphical User Interface specific to the third database and storing the data in the third database, the data comprising a copy of the item and objective information specific to the item;
  responsive to receiving an indication via user input through the management Graphical User Interface specific to the third database indicating that the item is related to the first case and the second case and is released for subjective review, storing the indication in the third database and automatically copying at least the objective information of the item from the third database to the first database and the second database;

responsive to receiving first case specific data that is specific to the item and the first case via user input through a Graphical User Interface specific to the first database, storing the first case specific data associated with the item and the first case in the first database and not in the second or third database;

responsive to receiving second case specific data that is specific to the item and the second case via user input through a Graphical User Interface specific to the second database, storing the second case specific data associated with the item and the second case in the second database and not in the first or third database; and responsive to receiving a modification or addition to at least the objective information of the item via user input through the management Graphical User Interface specific to the third database, storing the modification or addition to the objective information of the item in the third database, and automatically propagating the modification or addition to the objective information of the item to the first database and the second database based on the indication.

2. The method according to claim 1, wherein prior to linking the first database and the second database to the third database the method further comprises receiving and storing an indication that the first and second case are related to the third database.

3. The method according to claim 1, wherein receiving an indication that the item is related to the first case and the second case comprises:
assigning a tag to the item; and
assigning the tag to the first database and the second database.

4. The method according to claim 1, wherein the item of common evidentiary information is a sound recording, image, links or video.

5. The method according to claim 1, wherein the objective information specific to the item includes bibliographic data of the item.

6. The method according to claim 1, wherein the first case specific data or second case specific data includes any one or more of comments, relevant issues, whether it is discoverable, an indication of its importance and any other annotations that relate specifically to the first case or the second case respectively.

7. A non-transitory computer-readable medium storing a program that when executed causes a computer to operate in accordance with the method of claim 1.

8. A computer system to aid the management of evidentiary information related to a first case and a second case, the computer system comprising:
a first database for storing case specific data for the first case;
a second database for storing case specific data for the second case;
a third database for storing common facts and/or common issues shared between the first case and the second case; and
a processor configured to:
create the first database, the second database, and the third database,
link the first database and the second database to the third database via user input through a management Graphical User Interface specific to the third database and storing the linking in the third database, receive data for an item of common evidentiary information via user input through the management Graphical User Interface specific to the third database and store the data in the third database, the data comprising a copy of the item and objective information specific to the item, responsive to receiving an indication via user input through the management Graphical User Interface specific to the third database indicating that the item is related to the first case and the second case and is released for subjective review, store the indication in the third database and automatically copy at least the objective information of the item from the third database to the first database and the second database, responsive to receiving first case specific data that is specific to the item and the first case via user input through a Graphical User Interface specific to the first database, store the first case specific data associated with the item and the first case in the first database and not in the second or third database, responsive to receiving second case specific data that is specific to the item and the second case via user input through a Graphical User Interface specific to the second database, store the second case specific data associated with the item and the second case in the second database and not in the first or third database, and responsive to receiving a modification or addition to at least the objective information of the item via user input through the management Graphical User Interface specific to the third database, store the modification or addition to the objective information of the item in the third database, and automatically propagate the modification or addition to the objective information of the item to the first database and the second database based on the indication.

9. The computer system according to claim 8, wherein one or more of the first database, second database and third database is distributed.

10. The computer system according to claim 8, wherein the processor is further configured to provide the Graphical User Interface specific to the first database and the Graphical User Interface specific to the second database for presenting the evidentiary information to a secure user group.

11. The computer system according to claim 10, wherein the for Graphical User Interface specific to the first database is operable to receive the first case specific data.

12. The computer system according to claim 10, wherein the Graphical User Interface specific to the second database is operable to receive the second case specific data.

13. The computer system according to claim 10, wherein the Graphical User Interfaces specific to the first database and second database are not operable to receive the item.

14. The computer system according to claim 10, wherein one or more of the Graphical User Interface specific to the first database, the Graphical User Interface specific to the second database and the management Graphical User Interface specific to the third database is an online Graphical User Interface, such as a website.

15. The computer system according to claim 8, wherein the management Graphical User Interface specific to the third database is not operable to receive first case specific data or second case specific data.

16. The computer system according to claim 8, wherein the Graphical User Interface specific to the third database is operable to receive the indication.

\* \* \* \* \*